(12) United States Patent
Maslov

(10) Patent No.: US 7,204,011 B2
(45) Date of Patent: Apr. 17, 2007

(54) METHOD FOR MANUFACTURING ADAPTIVE MACHINES

(75) Inventor: Boris A. Maslov, Reston, VA (US)

(73) Assignee: Matra Manufacturing & Services SAS, Elancourt Cedex (FR)

( * ) Notice: Subject to any disclaimer, the term of this patent is extended or adjusted under 35 U.S.C. 154(b) by 465 days.

(21) Appl. No.: 10/771,496

(22) Filed: Feb. 5, 2004

(65) Prior Publication Data

US 2004/0200057 A1     Oct. 14, 2004

Related U.S. Application Data

(63) Continuation-in-part of application No. 10/359,305, filed on Feb. 6, 2003.

(51) Int. Cl.
*H02K 15/00* (2006.01)
(52) U.S. Cl. .......... 29/596; 29/598; 29/592.1; 29/605; 29/736; 310/156.12; 310/216; 310/218; 700/95
(58) Field of Classification Search .......... 29/596, 29/598, 592.1, 605, 736; 310/156.12, 216, 310/218; 700/95
See application file for complete search history.

(56) References Cited

U.S. PATENT DOCUMENTS

| 5,644,493 | A | | 7/1997 | Motai et al. |
| 5,742,997 | A | * | 4/1998 | Beakes et al. ........ 29/596 |
| 5,875,540 | A | | 3/1999 | Sargeant et al. |
| 6,067,702 | A | * | 5/2000 | Clemenz et al. ........ 29/596 |
| 6,492,756 | B1 | | 12/2002 | Maslov et al. |

FOREIGN PATENT DOCUMENTS

EP     0 895 337 A1     2/1999

* cited by examiner

*Primary Examiner*—A. Dexter Tugbang
*Assistant Examiner*—Tim Phan
(74) *Attorney, Agent, or Firm*—Marshall, Gerstein & Borun LLP

(57) ABSTRACT

A method for assembling machines using multiple, structurally equivalent components. The characteristics of each component are tested. The tested components are sorted into component classes using the test information. Individual components are selected from the classes and combined in a manner that, when combined, will provide desired price/performance characteristics in the machine. Machines with improved price/performance characteristics may be assembled without requiring change to the quality of the components, or the manner in which the components are manufactured.

4 Claims, 16 Drawing Sheets

Rotor Assembly

Rotor Assembly, Section View

Rotor Assembly, Rotor Cover Removed

Permanent Magnet Modules

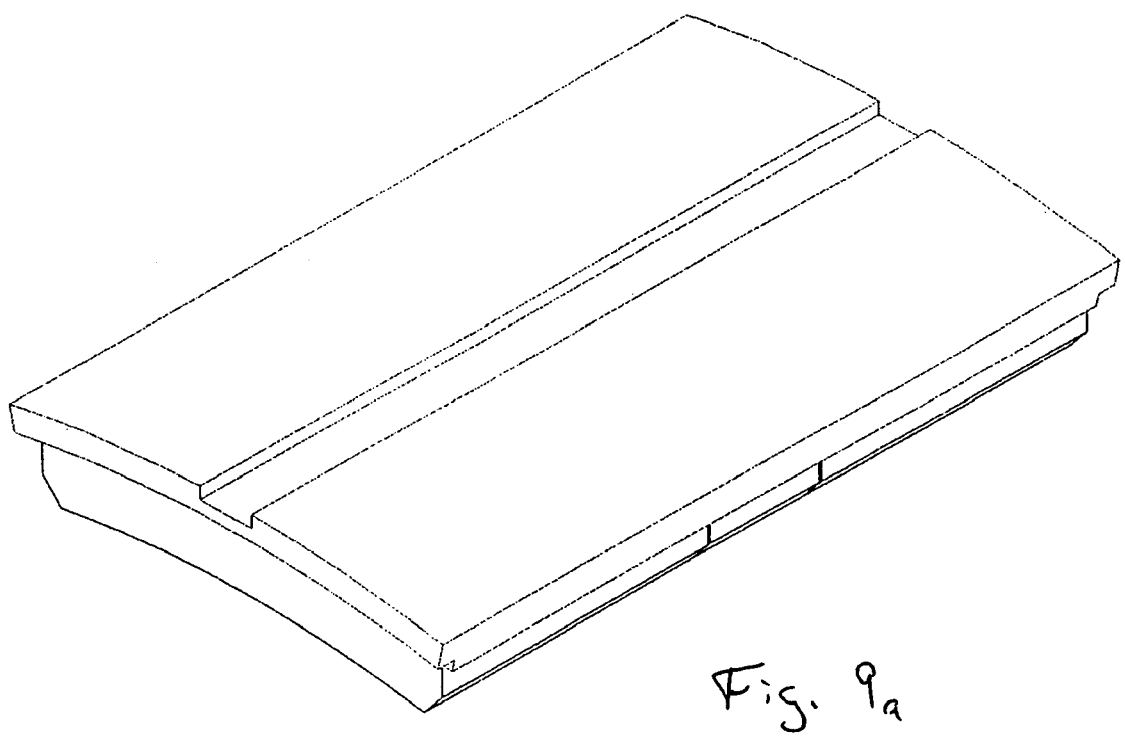
Fig. 9a
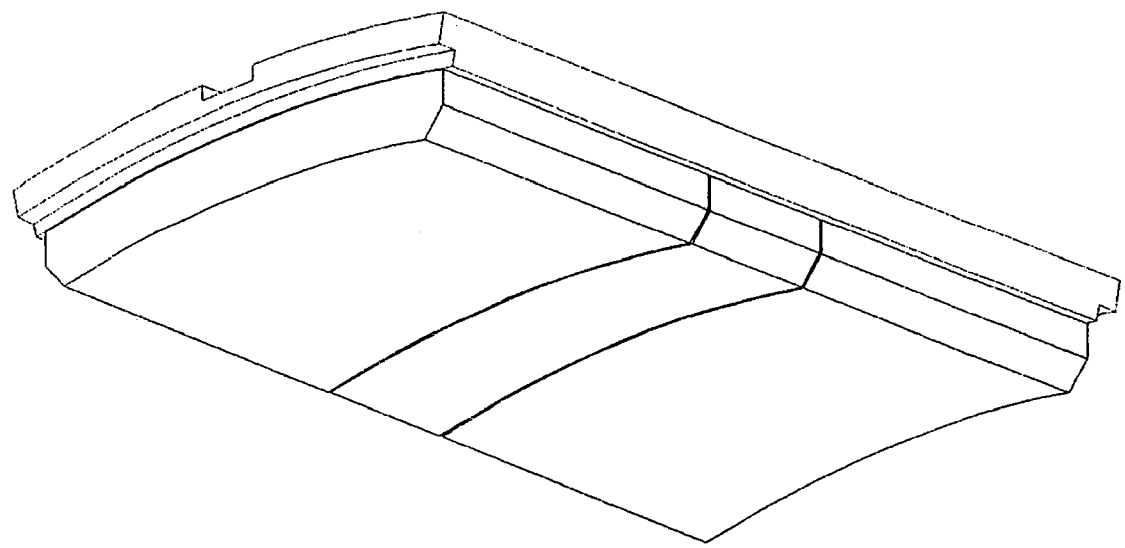
Permanent Magnet Module    Fig. 9b

Rotor Housing

Rotor Cover

_US 7,204,011 B2_

METHOD FOR MANUFACTURING ADAPTIVE MACHINES

RELATED APPLICATIONS

This application is a continuation-in-part of U.S. application Ser. No. 10/359,305 filed Feb. 6, 2003, which application claims priority from commonly assigned, U.S. application Ser. No. 09/826,423 of Maslov et al., filed Apr. 5, 2001, now U.S. Pat. No. 6,492,756 commonly assigned, U.S. application Ser. No. 09/826,422 of Maslov et al., filed Apr. 5, 2001, now U.S. Pat. No. 6,949,864 commonly assigned, U.S. application Ser. No. 09/966,102, of Maslov et al., filed Oct. 1, 2001, now U.S. Pat. No. 6,787,951 commonly assigned, U.S. application Ser. No. 09/993,596 of Pyntikov et al., filed Nov. 27, 2001, now U.S. Pat. No. 6,927,524 commonly assigned, U.S. application Ser. No. 10/173,610, of Maslov et al., filed Jun. 19, 2002, now U.S. Pat. No. 6,727,668 commonly assigned, U.S. application Ser. No. 60/399,415, of Maslov et al., filed Jul. 31, 2002, commonly assigned, U.S. application Ser. No. 10/290,537, of Maslov et al., filed Nov. 8, 2002, now U.S. Pat. No. 6,794,839 commonly assigned, U.S. application Ser. No. 10/353,075 of Maslov et al., filed Jan. 29, 2003, now U.S. Pat. No. 6,940,242, each of which is hereby incorporated by reference in its entirety.

FIELD OF THE INVENTION

The present invention generally relates to systems and methods for manufacturing electric machines, including electric motors, electric generators and other machines embodying a new "adaptive" architecture.

SUMMARY OF THE INVENTION

The present invention relates to systems and methods for manufacturing electric machines, including electric motors and electric generators embodying a new "adaptive" architecture. Such new adaptive electric machine technology is described in the U.S. applications identified in the section of the present application designated "Related Applications."

Adaptive electric machines may provide numerous advantages. Among those advantages are simple machine topology facilitating the manufacturing process and reducing costs related to that process.

For example, in a preferred embodiment, an adaptive multiphase electric machine may include a rotor and a stator. The stator may include multiple stator core elements. The multiple stator core elements may be arranged in groups. Each group of stator core elements may include at least one stator core element. Each group of stator core elements may be associated with a corresponding one of the phases of the multiphase machine. The stator core elements in each group are separated from the stator core elements in each other group. The separation may be, for example, a structural separation, or an electromagnetic separation, or both. A controller controls electrical flow in each group of stator core elements independently of electrical flow in each other group. Each phase of the multiphase machine is controllable independently of each other phase. This enables a relative rotation to be established between the rotor and the stator at a speed and a torque that are dynamically selectable. The controller is operable to optimize the efficiency of the machine for each selected torque and speed.

Adaptive electric machines may be characterized as having a segmented architecture. The machine architecture comprises multiple components, such as multiple stator core elements, that are structurally identical or equivalent. This enables the machines to be assembled using mass production techniques that have previously not been feasible.

In one preferred system and method for assembling machines using multiple, structurally equivalent components, the characteristics of each component are tested. The tested components are sorted into component classes using the test information. Individual components are selected from the classes and combined in a manner that, when combined, will provide desired price/performance characteristics in the machine. Machines with improved price/performance characteristics may be assembled without requiring change to the quality of the components, or the manner in which the components are manufactured.

The following detailed description shows only a preferred embodiment or embodiments of the invention. The invention may be capable of other and different modes, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawings.

FIG. 8a shows an illustrative rotor assembly of the present invention in perspective.

FIGS. 9a–9b show examples of permanent magnet modules of the present invention.

DETAILED DESCRIPTION OF THE INVENTION

Figure 1:
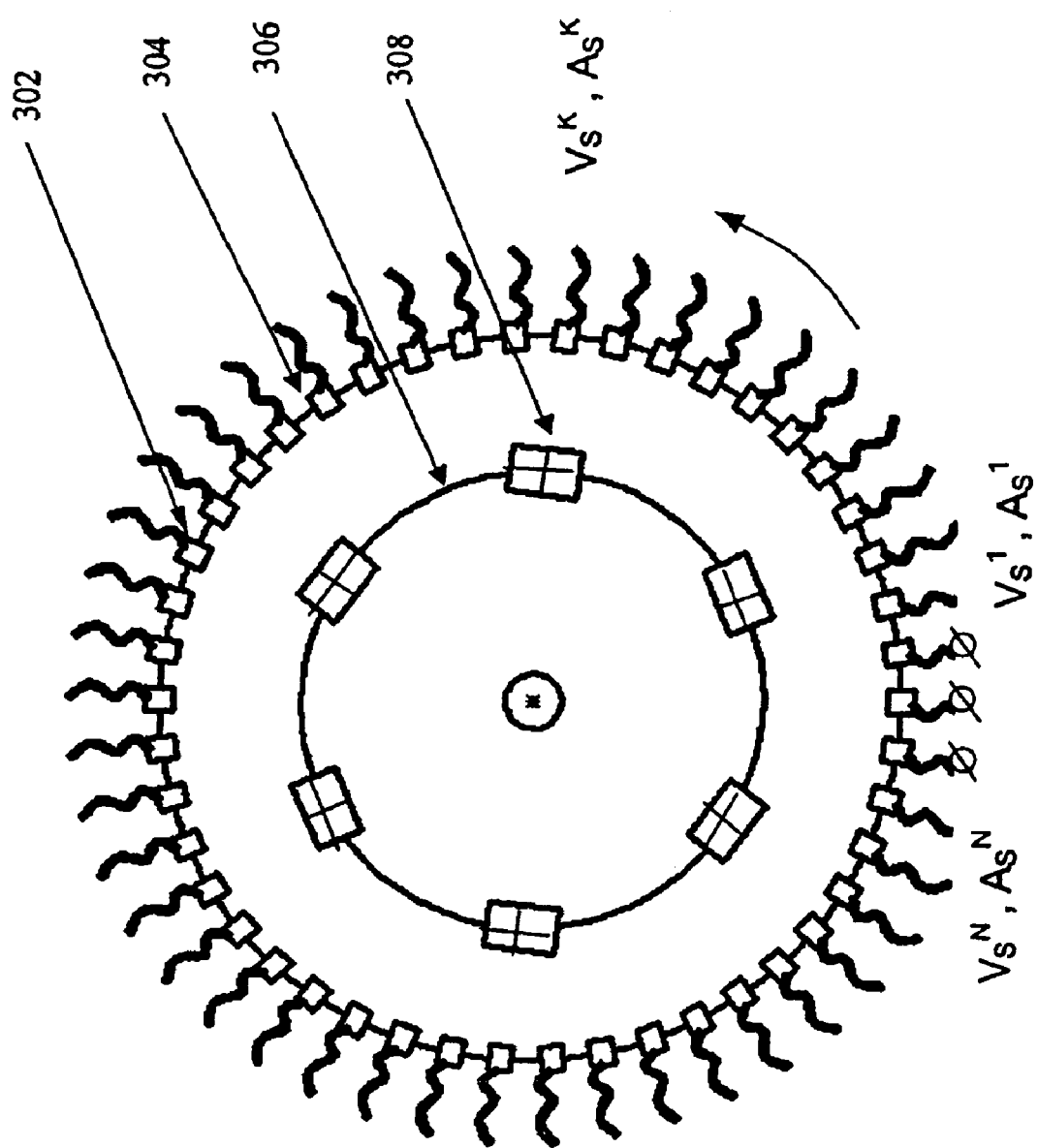
FIG. 1 shows a schematic representation of one embodiment of an adaptive motor with a permanent magnet rotor.

FIG. 1 shows an example of an adaptive electric machine with a rotor 306 with permanent magnets 304, and a stator 302 with electromagnets 304.

Figure 2:
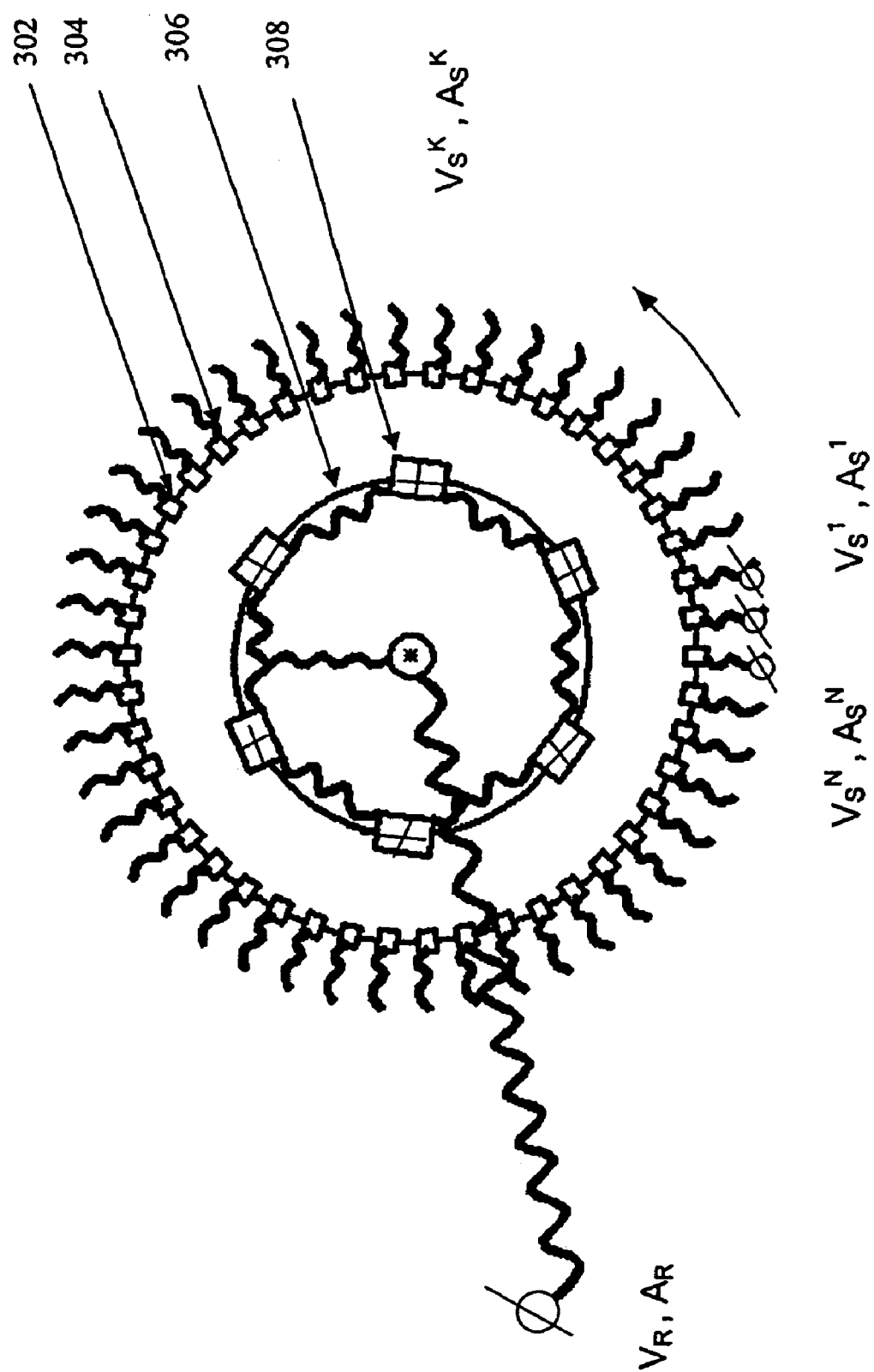
FIG. 2 shows a schematic representation of one embodiment of an adaptive motor with a wound rotor.

FIG. 2 shows a slightly different arrangement, a so-called wound rotor, in which the magnets 308 in the rotor 306 are in fact electromagnets with separate excitation. A characteristic of this embodiment is that when the electromagnets 308 in the rotor 306 are not excited, the rotor 306 can freely rotate without inducing current in the electromagnet circuits 304 in the stator 302—a highly desirable characteristic for transportation applications.

Figure 3:
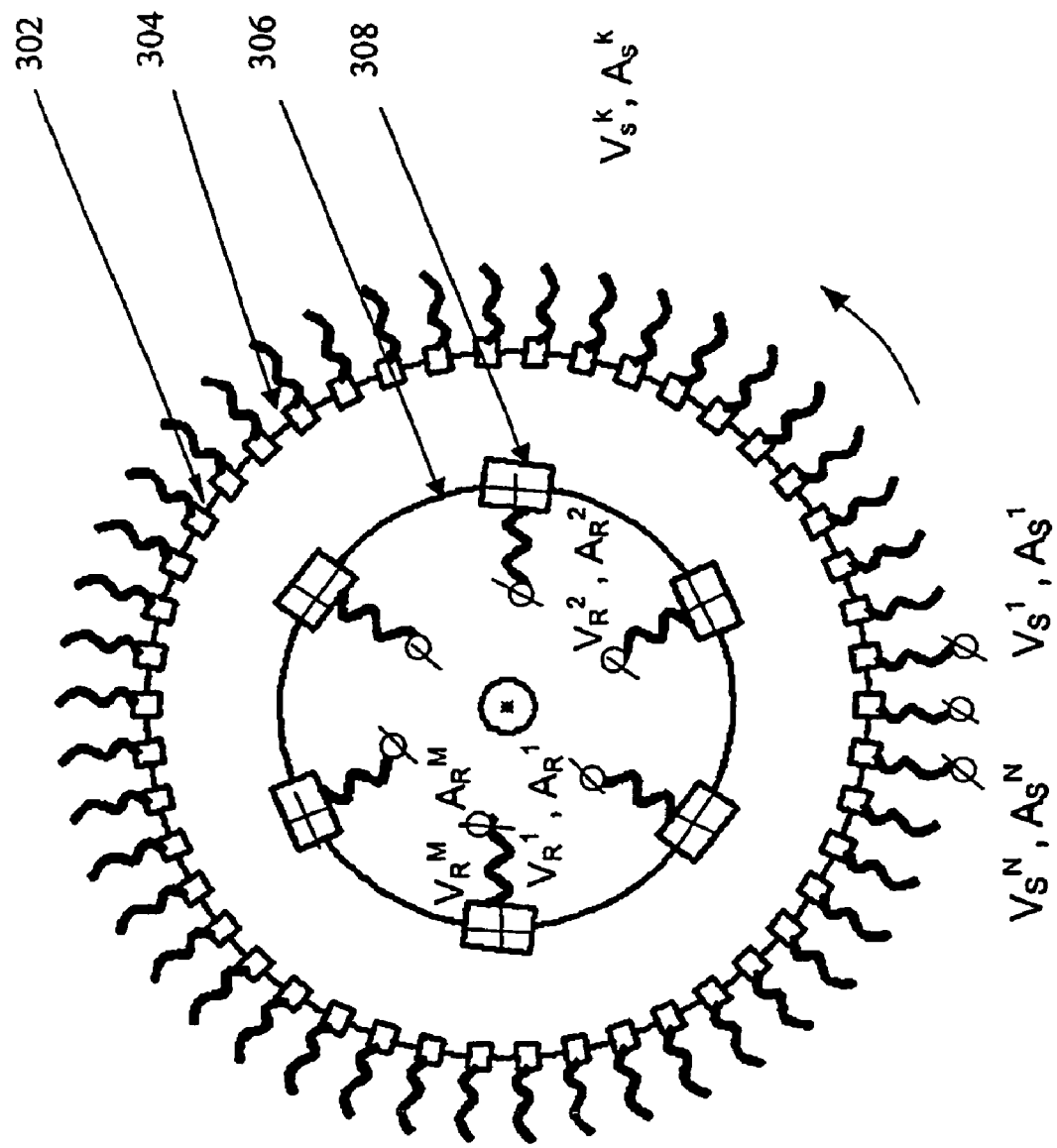
FIG. 3 shows a schematic representation of one embodiment of an adaptive motor with independently energizable rotor electromagnetic circuits.

FIG. 3 shows one embodiment of an adaptive machine that may allow independent excitation of every magnet of the machine. The electromagnets 308 in the rotor 306 and the electromagnets 304 in the stator 302 may all be independently excited. Even though this design may offer the most flexibility and the greatest number of independent variables, the costs of its implementation may be high, and this design may be justified only in the most sophisticated applications.

Figure 4:
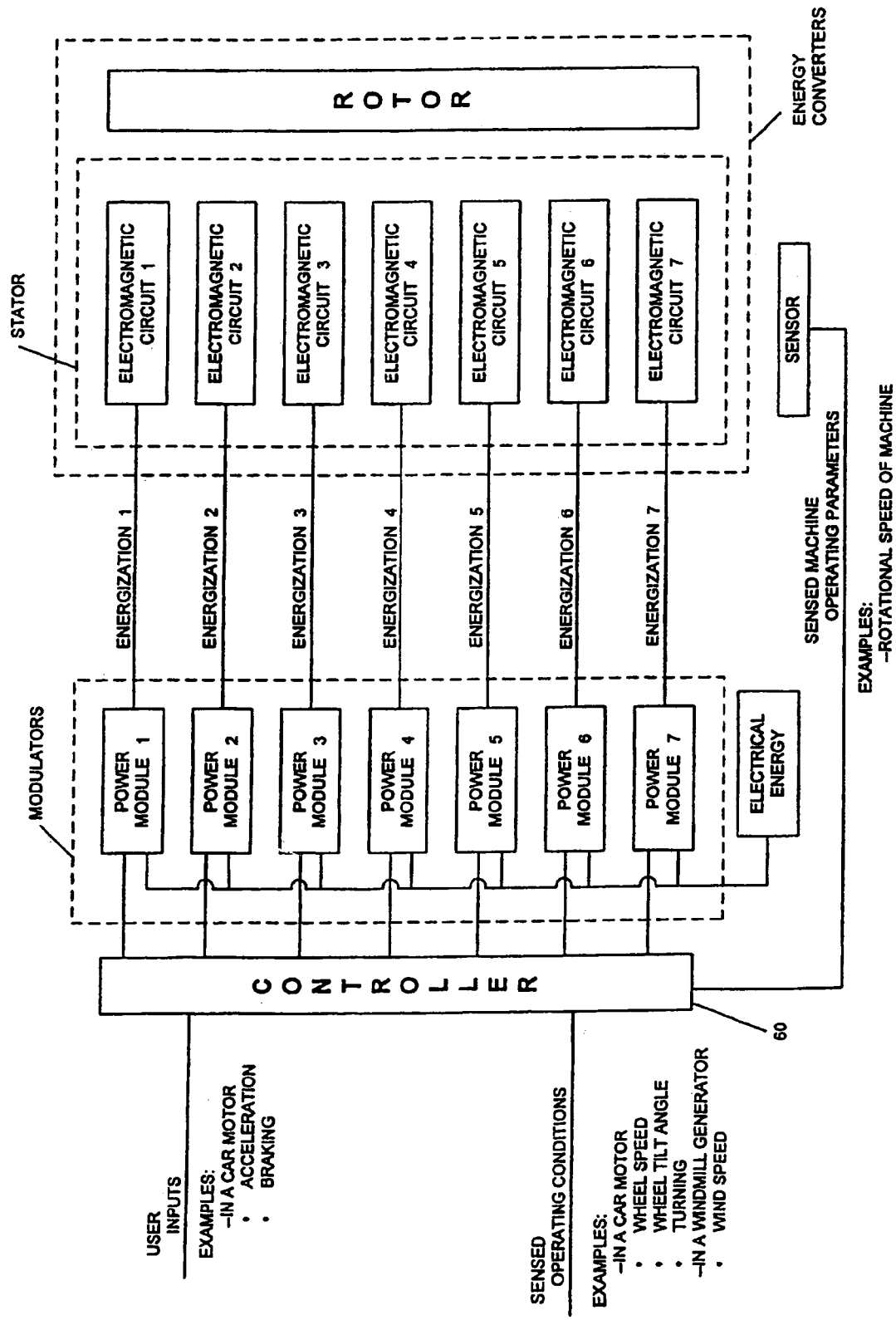
FIG. 4 shows an example of a block diagram of one embodiment of an adaptive electric machine.

FIG. 4 shows a block diagram of an example of one embodiment of an adaptive electric machine. In this example the controller 60 generates a control signal based on user inputs, sensed operating conditions, and sensed machine operating parameters.

In this embodiment, each electromagnetic circuit, or phase, may be sufficiently isolated from each of the other electromagnetic circuits to substantially eliminate electrical and electromagnetic interference between the circuits. This may increase the number of independent machine parameters that may be varied and controlled. As a result, this may increase the effective response of the electric machine to control and optimization.

In addition, each electromagnetic circuit, structurally and/or electromagnetically separated from each of the others, may receive a separate control signal from the controller, thus controlling the electrical flow in each group of electromagnetic circuits independently of electrical flow in each other group. That may allow each electromagnetic circuit, or phase, to be controllable independently of each other phase, and thereby establish relative rotation between the rotor and the stator at a speed and a torque that are dynamically selectable. The controller may be operable to optimize the efficiency of the electric machine for each selected speed and torque.

Figure 5:
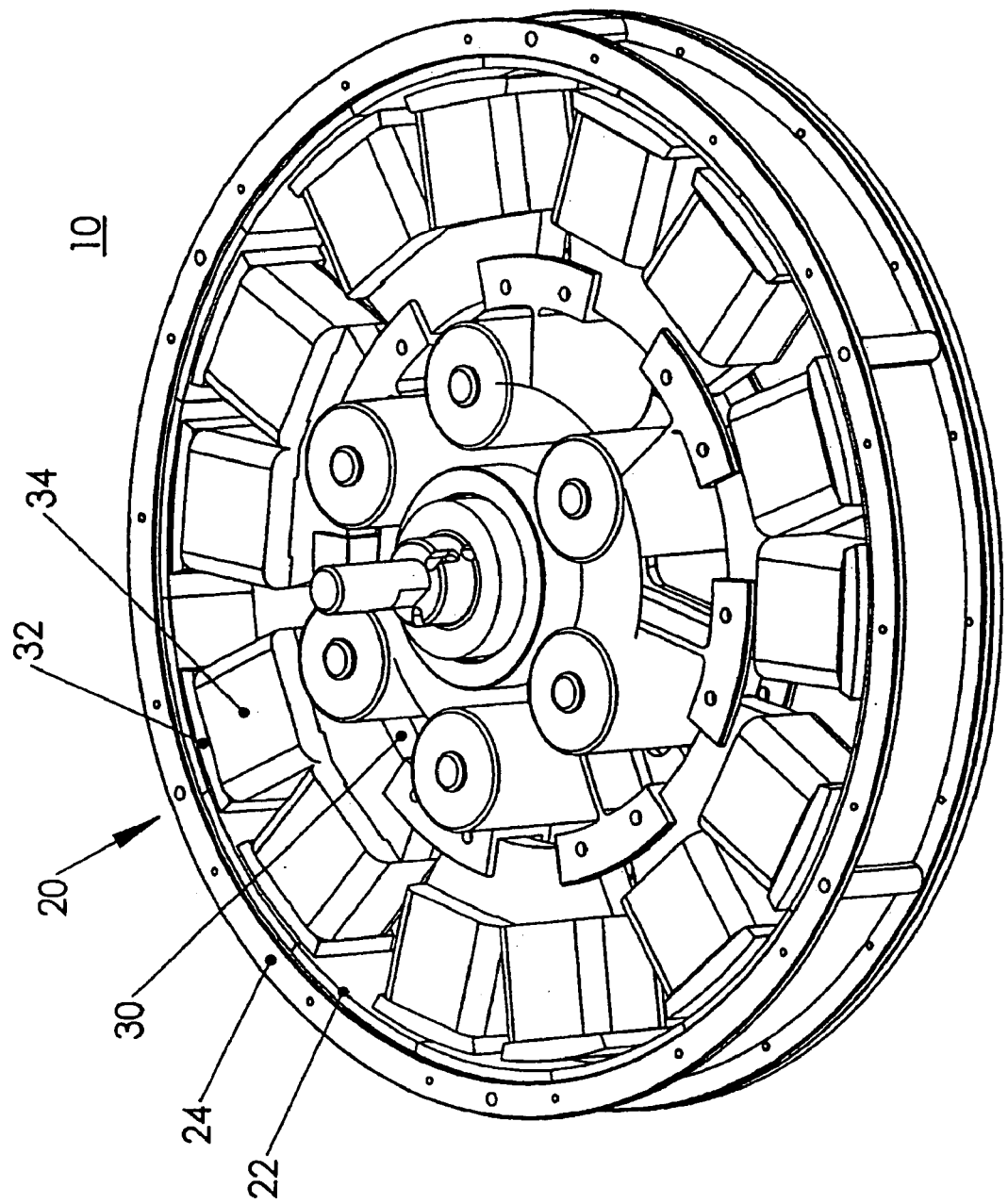
FIG. 5 shows an example of a cutaway view of the basic structure of one embodiment of an adaptive electric machine that has seven electromagnetic circuits.

FIG. 5 shows an example of a cutaway view of the basic structure of an embodiment of an adaptive electric machine 10. Some of the elements illustrated in FIG. 5 are shown in more detail in the exploded view of FIG. 6. In this example the electric machine 10 has a circular permanent magnet rotor 20 surrounding a circular stator 30. However, an adaptive electric machine may comprise a movable element other than a rotor, or a stationary element other than a stator, or comprise a first member and a second member, or at least one member.

In this example, the rotor 20 and the stator 30 may be separated by an air gap. The rotor 20 and the stator 30 may be centered on a stationary shaft 36, which is located at the axis of rotation for the rotor 20.

In this example, the stator 30 has seven ferromagnetically isolated elements, or stator or "core element" groups. Each stator group 32 may be made of magnetically permeable material, and may be separated from direct contact with each other stator group. Each stator group may form a separate electromagnetic circuit, each having windings wound on an independent portion of the stator, with each portion are structurally connected only by non-magnetic material. Or each stator group may have windings 34 formed on each of their two poles. Or an adaptive electric machine may have at least two windings, forming energizable electromagnetic circuits, wound on portions of either a movable element or a stationary element, or both.

Seven stator groups 32 are shown in this example, each group with two salient electromagnet poles, and each substantially equally spaced along the air gap. Each stator group may be sufficiently isolated to substantially eliminate electrical and electromagnetic interference (such as induced currents and electromagnetic flux) between the groups.

In this example the rotor 20 has sixteen permanent magnets 22. The illustrated permanent magnets may be substantially equally spaced along the air gap and affixed to a non-magnetic circular back plate 24. The back plate 24 may be formed of aluminum or other non magnetically permeable material. The back plate 24 may form part of the electric machine housing, which has side walls 26 attached to it.

The magnetic flux produced by the rotor's permanent magnets 22 may be enhanced by adding a magnetically permeable element (not shown) mounted to the back of the rotor permanent magnets 22. The number of stator poles and rotor magnets illustrated is merely exemplary. Various ratios may be used to provide desired operational parameters. For example, fewer electromagnets spaced at greater distances may produce different torque and/or speed characteristics.

In one embodiment the permanent magnets 22 may comprise Neodymium Iron Boron of a nominal BHmax or energy product ranging between 238 to 398 kJ/m 3 (30 to 50 MGOe). Shaping the magnets in rounded sectors with square cross sections and tapered edges may help minimize cross interference of unwanted magnetic flux.

Optimizing the geometry of the magnets 22 may also optimize the permeance and the recoil characteristics of the magnet subsystem for an intended application. Further modifications may be made using three-dimensional pole shaping of the electromagnetic cores in order to correct the magnetic potential difference profile developed between the electromagnetic stator groups 32 and the permanent magnet rotor assembly. Doing so may reduce the cogging that could occur during the energization commutation and angular displacement of the rotor 20.

Several other parameters of the rotor 20 may be considered to achieve more optimal performance for a particular application. For example, some of these other parameters may include: grade of the magnet; energy density and the overall magnetic characteristics of the magnet grade; size and dimensions of the magnet to yield the required demagnetization factor (and thus the overall operating condition of the magnet assembly); magnetic configuration and polarization of the permanent magnets; thermal stability of the magnets; finishing and post processing steps taken in manufacturing of the magnets for the intended application; location and mounting separation of the magnets; surface and subsurface eddy current effects on the magnet segments at maximum angular velocity of the machine; homogeneity of the magnetization over the curvilinear surface of the magnet; uniformity of the radial and axial polarizations of the magnets; gap optimization between two separate adjacent magnets in the stator; mechanical characteristics of the edges of the magnets; return flux path of the magnet as provided by the back iron ring.

In another example, the side walls 26 of the electric machine may be removable to make it easier to take out and replace an individual stator group that may become damaged or in need of repair, without replacement of the entire unit. As each of the stator core segments 32 may be made interchangeable, maintenance of the stator 10 may be a relatively simple matter of inserting a spare stator core segment 32 at the appropriate mating position between the plates and connecting the ends of the windings.

The illustrated stator core segments 32 may be secured to a rigid skeletal structure 40 that may be centrally fixed to the shaft 36. Spine members 42, which may be equal in number to the number of stator groups, may extend outward from the center of the skeletal structure 40 to some U-shaped plates 44. The sides of the U-shaped plate 44 and the stator core segments 32 may contain mating holes by which the stator segments 32 may be fixed to the skeletal structure 40. Each U-shaped plate 44 may attach to an adjacent pair of stator core segments 32.

Each stator core segment 32 and adjoining pair of spine members 42 together define a space within which circuit elements may be contained. The rigid spine portions 42 have sufficient surface area to provide the necessary structural support as well as to accommodate circuit boards 45. A circuit board or hybrid module may be affixed to each spine portion in any conventional manner.

To enable complex three-dimensional topologies of the electromagnetic cores used in this machine, the required electromagnetic cores may preferably be manufactured from Soft Magnetic Composite ("SMC") powder alloys or alloyed sintered powder materials ("SPM"), as opposed to laminated electrical steel. These SMC and SPM alloys may allow stringent geometrical constraints and the required electromagnetic characteristics to be specified for the intended application, which may then be further contrasted with the designated electrical power requirements. Moreover, SMC alloys may promote the realization of an acceptable specific power loss (W/kg) and relative permeability at the application flux density levels and excitation frequencies. This may allow a desired peak torque output to be achieved, with a significant reduction in material weight and manufacturing overheads. Use of SMC materials may promote the construction of electrical machines with complex magnetic paths and three-dimensional magnetic field distribution, an advantage that may stem from the anisotropic nature of the SMC materials. With the ability to define the magnetic field in three dimensions, the flexibility of the powder metallurgy may allow efficient production of complex shaped parts as well as a significant streamlining of the electromagnetic design assembly with an increase in effective power output and weight reduction.

Several other parameters of the stator 10, as shown in FIG. 5, may be adjusted to achieve more optimal performance for a particular application. For example, some other parameters may include the following: design of the electromagnetic circuits; pole to pole separation and isolation of the electromagnet cores; magnet/electromagnet permissible air gap; power loss of the core material (hysteresis/eddy current/anomalous loss); saturation flux density and permeability of the material; thermal management temperature and physical stability; mechanical rigidity and environmental stability; excitation current, phase angle, duty cycle, overall sequencing and the control strategy of the stator system in a given application; optimal angular positioning with respect to the chosen energization scheme; Variation of the phase reluctance and thus the inductance with respect to angle.

Figure 7:
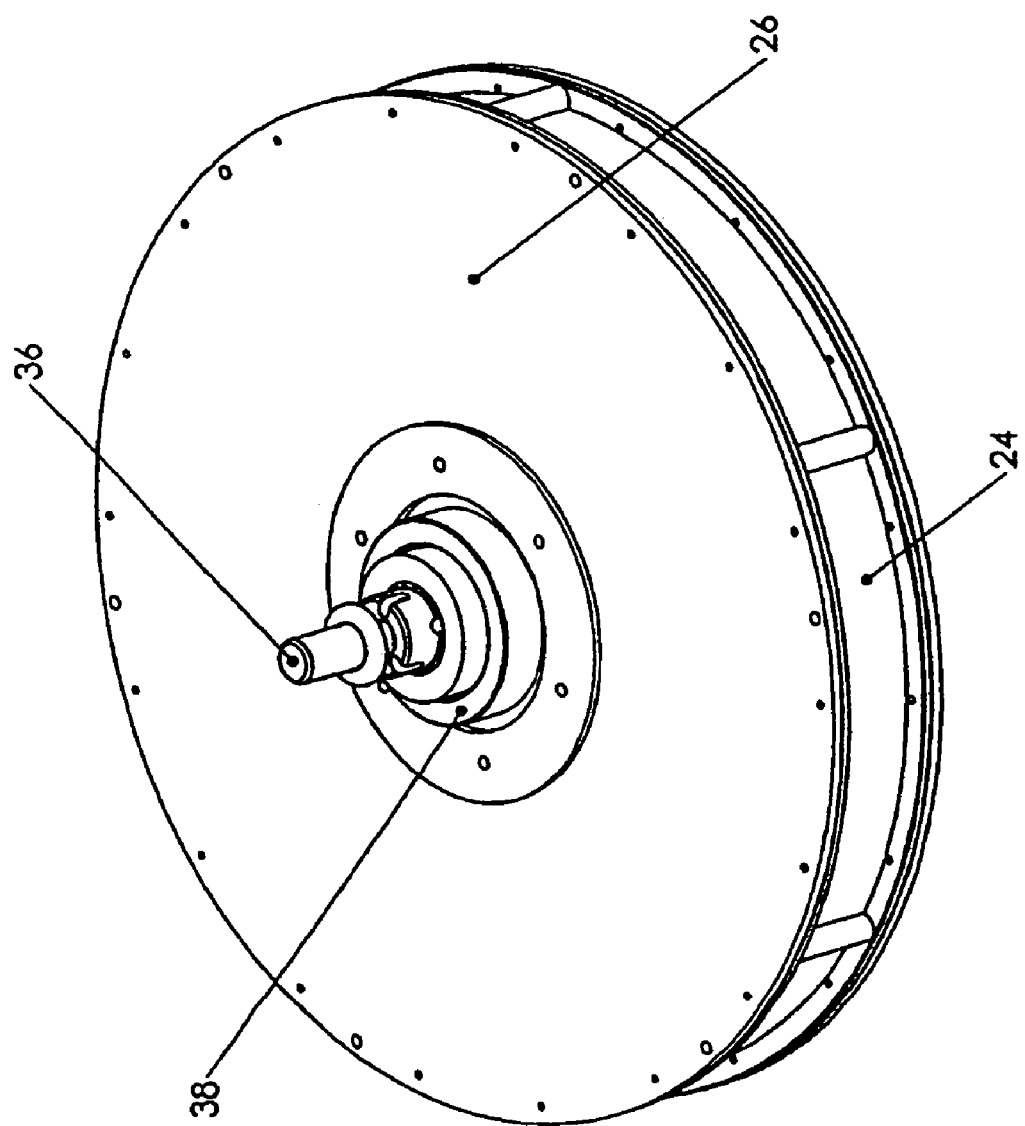
FIG. 7 shows an example of a three dimensional external view of the electric machine system designed for use as an in-wheel motor for an electric vehicle.

FIG. 7 shows an example of a three dimensional external view of the electric machine system, designed for use as an in-wheel motor for an electric vehicle. In this example, the rotor housing outer ring 24 and the side walls 26 may be configured to form a wheel hub on which a tire (not shown) may be mounted directly or indirectly via spokes. The rotor wheel housing may be journalled for rotation about the stationary shaft 36 via bearings 38. The cylindrical rotor housing structure may surround the stator structure.

There are a variety of different ways in which the structure of the stator 10 and the rotor 20, and their elements, may be modified. For example, in one variation, the poles within each stator group may be separated by radial gaps that may be uniform for all stator groups. The extent of these gaps may be different from the spacing between the poles of adjacent stator groups. The stator pole gaps and the group spacings may each be different from the rotor angular pole gaps.

FIG. 5 shows fourteen stator poles (in seven stator pole groups) and sixteen rotor poles. However, the relatively independent dimensional relationships between the stator and rotor poles permit flexibility in setting the number of poles and dimensions. An odd, or preferably a prime, number of stator pole groups may be preferred to enable optimal performance. The number is by no means limited to seven, which is disclosed herein for purposes of illustration only. Similarly, each stator core element (or stator pole) group may comprise just one core element (or stator pole pair), or may comprise multiple core elements sharing a common isolated magnetically permeable structure. Each stator core element group may be associated with a phase of a multiphase machine.

The machines shown in the illustrated embodiments may be characterized as having a segmented architecture. The illustrated machine architecture comprises multiple components, such as the multiple stator core elements, that are structurally identical or equivalent. Similarly, the bases constitute another set of multiple discrete components that are structurally identical or equivalent. The same may be said for the spools and the windings. This enables the machines to be assembled using mass production techniques that have previously not been feasible.

Mass production of such machines may be achieved by separately manufacturing each of the components. Such manufacture may be achieved using known component manufacturing techniques. The separately manufactured components may then be supplied in large quantities or batches for subsequent assembly of the completed machines. Performance characteristics or other characteristics of each component may be tested separately, preferable prior to assembly of the machine. Then, based upon the information obtained as a result of such tests, the components may be sorted into a variety of different component classes. Components from one or more of the component classes may be mixed and matched in a manner that "fine tunes" the machines for the particular requirements of a given market, enabling the production of a variety of machines having different performance characteristics or price tags.

For example, each one of a batch of structurally similar components may be individually tested magnetically and then sorted into three different classes, designated A, B and C, depending upon the information obtained as a result of the magnetic testing. The testing would preferably be nondestructive. The testing may evaluate component characteristics that may include, for example, magnetic losses, density variations, mass variations, etc. Class A may represent tested components that possess "superior" magnetic characteristics. Class B may represent tested components that possess "average" magnetic characteristics. Class C may represent tested components that possess "inferior" magnetic characteristics.

Any of the components from any of the component classes A, B and C may be acceptable for manufacturing a machine in accordance with a given specification. Nevertheless, among the different component classes there may be sufficient variation in quality, performance or other component characteristics that would cause a buyer to pay a premium price for a machine manufactured with components from class A rather than components from class B. In this example the assembled machines could therefore be identified as class A machines, class B machines or class C machines, depending upon the class of components used to assemble the machines.

The components used to assemble the machines in classes A, B and C may be structurally indistinguishable. Similarly, the assembled machines in classes A, B and C may be structurally indistinguishable. Each machine in each of the classes A, B and C may be manufactured in accordance with the same specification. There is no requirement that each machine class must be manufactured differently, or manufactured according to different tolerances or specifications. The same equipment may be used to manufacture all classes of components, and to assemble all classes of machines. However, manufacture in accordance with the present invention enables the assembly of machines having different performance characteristics. In accordance with the information obtained as a result of the component testing, the components may be sorted and combined in a manner that enables structurally identical machines to be sold at different prices to different markets. The present invention thereby enables manufacture of essentially identical machines having sufficient differences in performance to enable a premium price to be charged for a "class A", i.e., superior, machine in contrast to a "class B", i.e., average, machine or a "class C", i.e., inferior, machine.

The present invention also enables a machine with improved performance and/or price characteristics to be assembled without necessarily requiring any change to the quality of the components, or the manner in which the components are manufactured. Instead, the present invention enables individual components to be selected and combined in a manner that, when combined, will provide the performance characteristic desired.

For example, a manufacturing objective may be to assemble multiple, identical machines that are each capable of producing 1.0 kilowatt of power. Without requiring changes to the basic manufacturing or assembly equipment, the present invention enables the production of structurally identical machines that have power outputs of 0.9 kw, 1.0 kw and 1.1 kw, for example. This is especially useful if customers are willing to pay one price for a "standard" machine delivering 1.0 kw of power, but willing to pay more for the same machine that provides an additional 0.1 kw of power and less for the same machine that provides 0.9 kw of power. The present invention enables variations in machine characteristics to be controlled or fine-tuned in a manner not previously possible, thereby enabling improvement in yield, improvement in profitability, and reduction in waste. Fewer components may be thrown away and more components may be accepted, because the otherwise rejectable components may be combined with other tested components that, in combination, reduce or eliminate an otherwise unacceptable defect.

In another example the machines may be structurally identical but provide different classes of fail-safe modes. In this example the class B machine may represent a multiphase machine having performance characteristics that assure continued functioning of the machine even if one of the multiple phases becomes inoperable. The class A machine may represent a multiphase machine having performance characteristics that assure continued functioning of the machine even if two of the multiple phases become inoperable. The class C machine may represent a multiphase machine having performance characteristics that do not assure continued functioning of the machine if any of the multiple phases becomes inoperable. In this example a price premium might be charged for class A machines over class B machines, and a price premium might be charged for class B machines over class C machines.

The testing and sorting performed in accordance with the present invention is well suited to adaptive machine technology, in which the machine comprises multiple, discrete structurally equivalent components.

Use of the present invention may reduce or, in some cases, may eliminate the need to test or screen the fully assembled machine. The present invention enables most or all of the testing to be accomplished at a component level, prior to full assembly of the complete machine.

The testing and sorting of the components need not be done by the assembler of the machine. In some cases testing and sorting of the components may be done by the component manufacturer, prior to delivery of the components to the machine assembler.

In an alternative embodiment, components may be tested, sorted and assembled with the objective of providing multiple machines all within a certain performance range. Relatively wide variations in performance characteristics of individual components may be compensated by selecting a combination of components that reduces of eliminates such variations in the finished machine. The finished machine may be more consistent in performance than would otherwise be permitted by the variable components. The result is a higher yield of marketable products.

The testing of the components may be accomplished by someone other than the machine manufacturer, at a location remote from the location of machine assembly. Each component may be labeled or provided with an electronic signature so that the tested characteristics are apparent to the machine assembler.

In another example, a rotary scanning system may enable each magnetic component to be tested prior to machine assembly for characteristics such as strength, metric, surface coating, magnetic uniformity, etc. Based upon the accumulation of statistical information obtained as a result of many such tests, a standard or benchmark or template may be defined. Sorting in accordance with the present invention may be performed based upon the template.

Another embodiment of the invention allows for the assembly of large motors and other electric machines, such as generators, in a segmented manner in situ, i.e., at the site where the motor is to be used. Although the specification uses the term electric "motor" for purposes of illustration, the present invention is equally applicable to electric machines, generally.

Conventionally, motors are created in a factory, transported to the site where they are needed, and then installed using heavy construction equipment (depending, of course, on the size of the motor). In cases where large industrial motors are needed, the conventional methods can be extremely expensive, due to transportation costs and the need for heavy machinery to install and align the motor. In the event that the motor was defective when assembled or incurred damage during the shipping or installation process, the expense can be even greater and the installation process more time consuming.

By assembling the motor from relatively small, individual components, the manufacturing and installation costs may be greatly reduced. Further, when a motor is assembled in situ, the opportunity to damage the motor or to assemble it in a defective manner is greatly decreased. Further, even if there are difficulties during the motor construction or it becomes defective, the fact that it is prepared from more easily replaceable components greatly reduces the costs associated with the use and operation of such a motor.

For example, electric machines used in the production of energy by means such as wind or water are likely to be very large and installed in remote locations. To generate electricity using a windmill, a very large machine weighing many tons may would be transported to a windy, remote location and installed at what might be a great distance from the nearest facility capable of servicing the machine. The method of the present invention may greatly ease the expense and difficulties associated with the prior art, by providing a method for fabricating and servicing electric machines in the locations where they are used.

According to the present method, the construction of the machine includes the fabrication of a number of electromagnetic cores, preferably from a soft magnetic composite powder alloy material ("SMC") or from a alloyed sintered powder materials ("SPM"). The stator core elements may be arranged in groups or assembled into a stator individually. With reference to FIG. 5, it is preferred that the stator elements are arranged into stator core groups 32 which are separated from direct contact with each other and electromagnetically isolated from other stator core groups 32 by connecting each portion using only non-magnetic materials. Preferably, each stator core group 32 may have windings 34 formed on each of their two poles or, alternatively, the windings may be made on the individual stator core elements. At each step in this process, quality control measures are implemented and those elements that fabricated which do not meet predetermined quality control criteria may be discarded, sold at a reduced price, or employed in machines where design tolerances are met. Those parts which meet the predetermined quality control criteria may be sold at a higher price or used machines where more rigorous design tolerances may be required.

In contrast, conventional stator elements are created as a complete unit that must be transported to the site where the machine is to be installed or installed in the machine and aligned during manufacturing with the machine being delivered as a completed product. The present invention facilitates machine construction by allowing for the assembly of the stator in segments and installed at the site where the machine is to be used. As well, such a construction technique allows for greater ease in the replacement of defective components in the machine, such as when winding fail. This avoids the need to remotely manufacture the stator and to have the large structure shipped over potentially vast distances. As well, quality control measures can be taken during each step of the stator assembly process.

Figure 6:
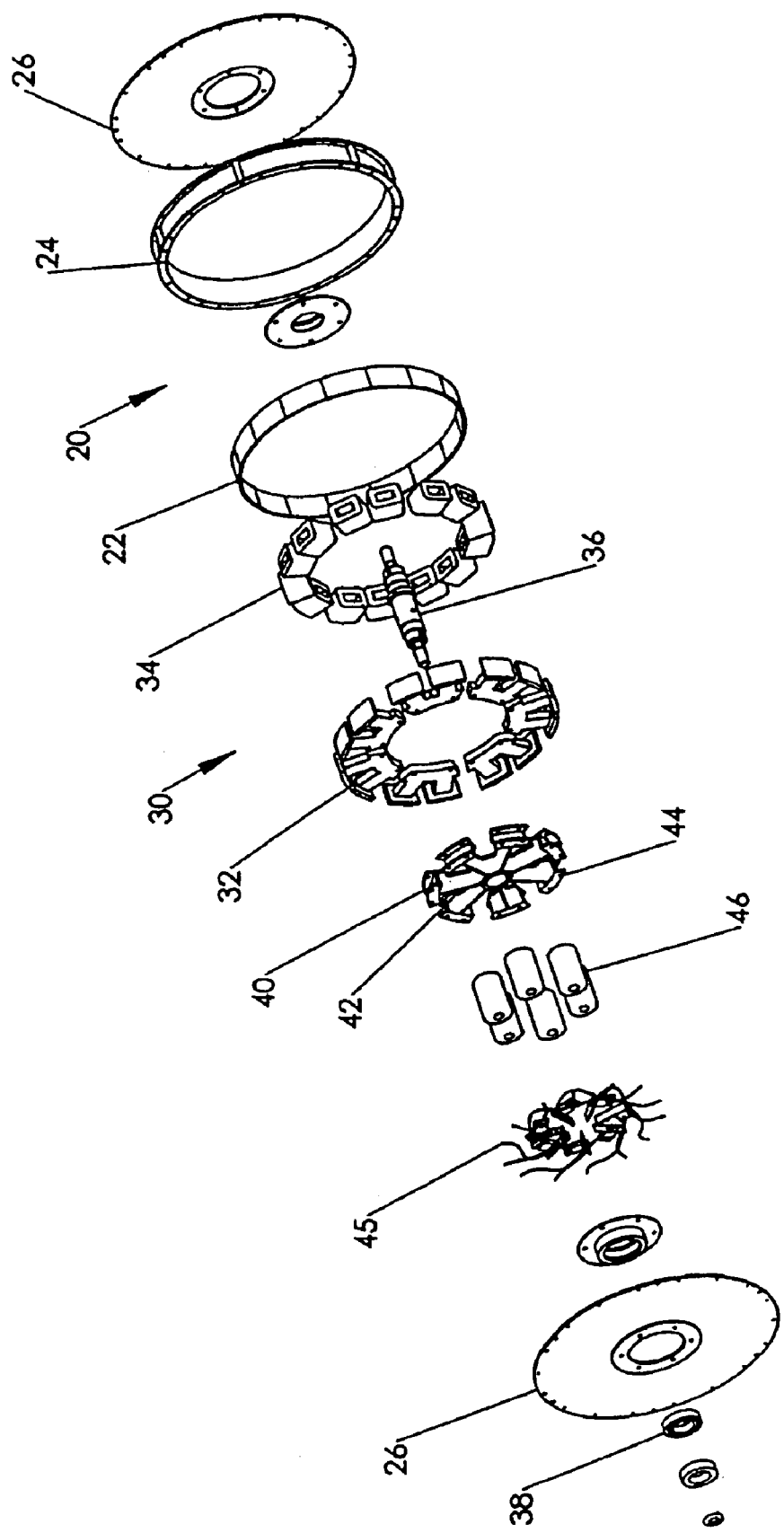
FIG. 6 shows an example of an exploded view of one embodiment of an adaptive electric machine that has seven electromagnetic circuits.
Figure 7A:
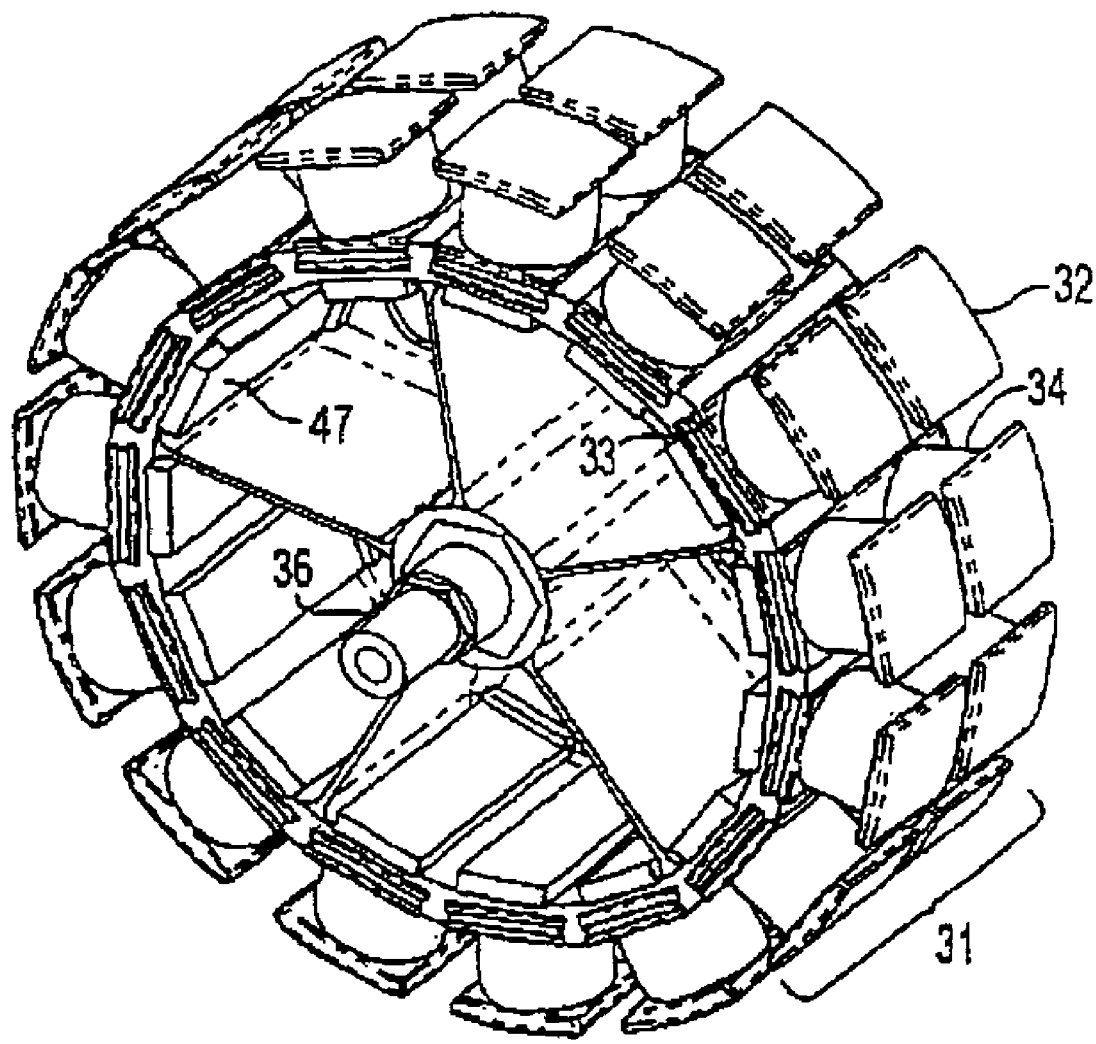
FIG. 7a shows an illustrative embodiment of a stator according to the present invention having a segmented core.
Figure 7C:
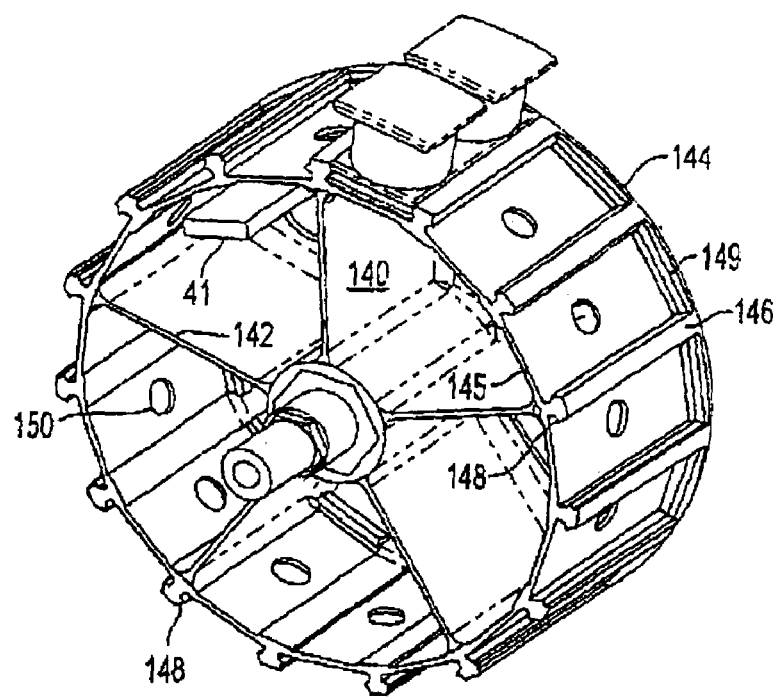
FIG. 7c shows an illustrative embodiment of a stator according to the present invention having a segmented core with a single electromagnet pole pair partially inserted into the stator housing.
Figure 7B:
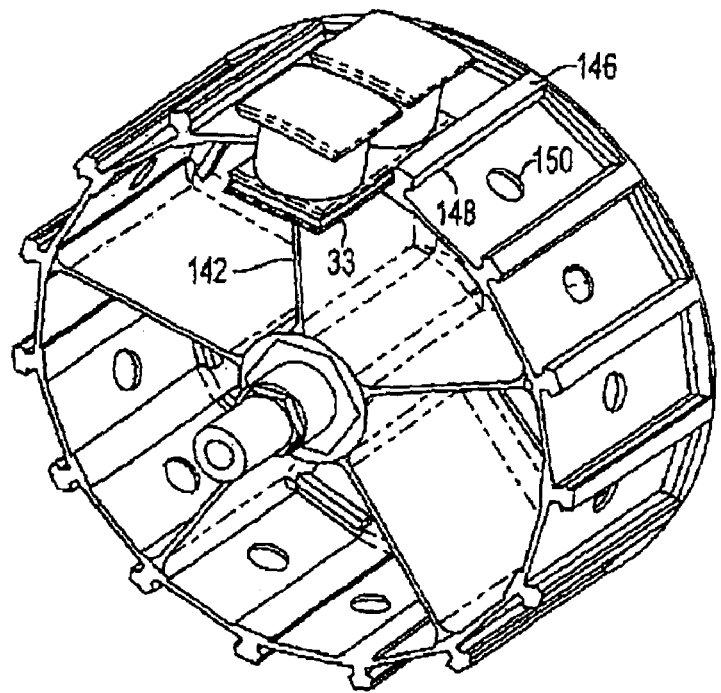
FIG. 7b shows an illustrative embodiment of a stator according to the present invention having a segmented core with a single electromagnet pole pair inserted into the stator housing.
Figure 7A:
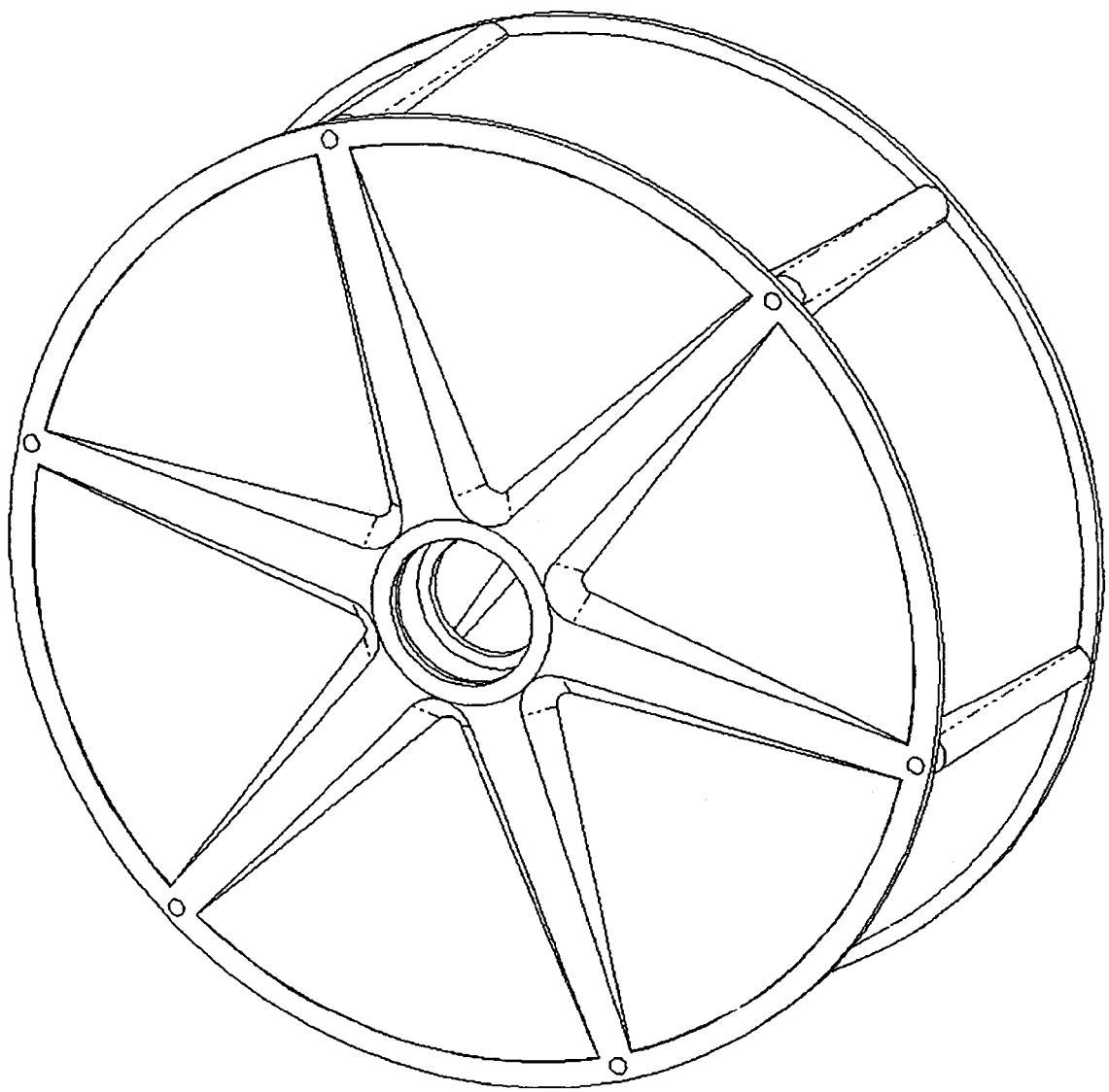
Figure 8B:
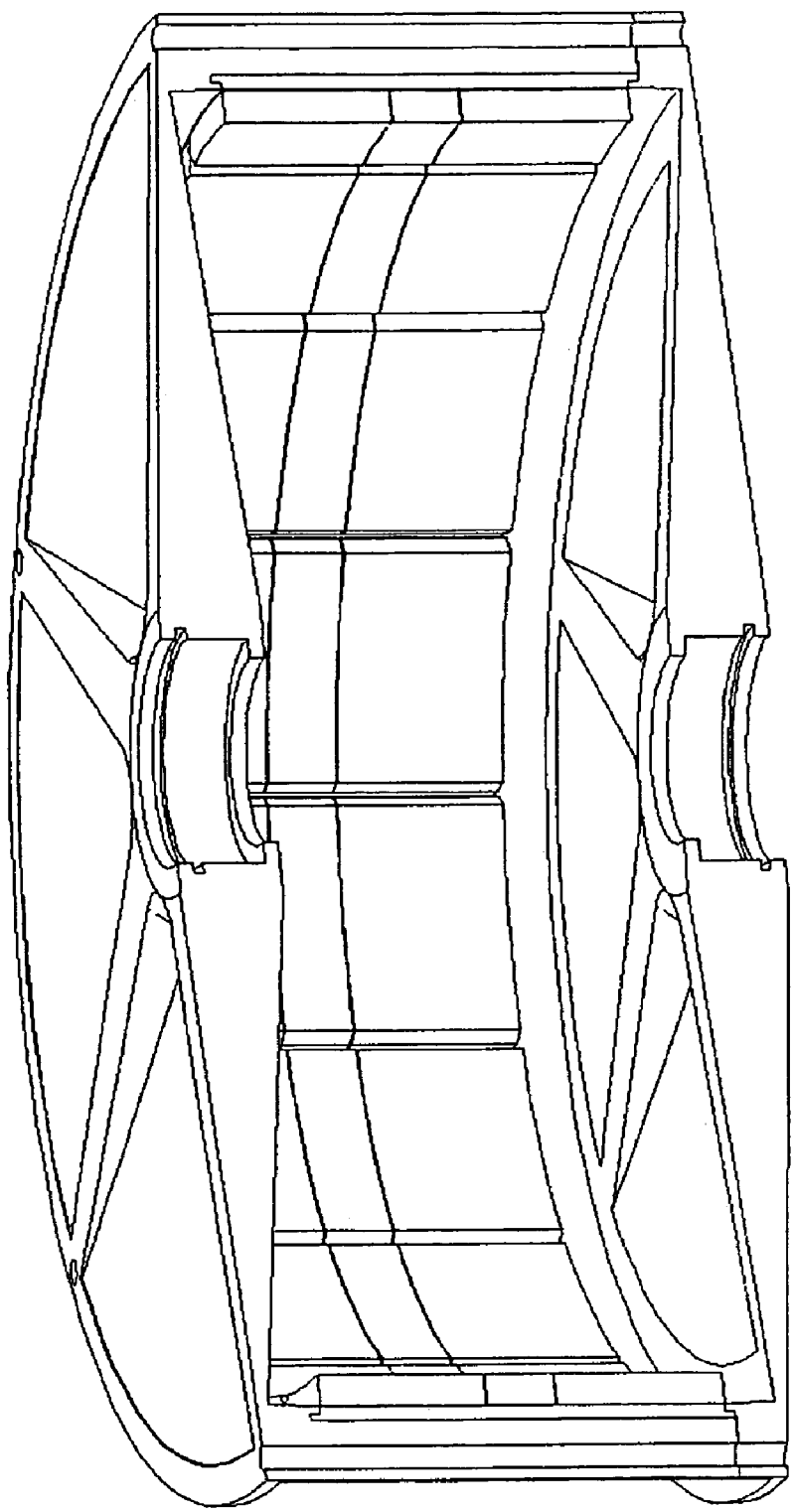
FIG. 8b shows a cross-sectional view of an illustrative rotor assembly of the present invention.
Figure 8C:
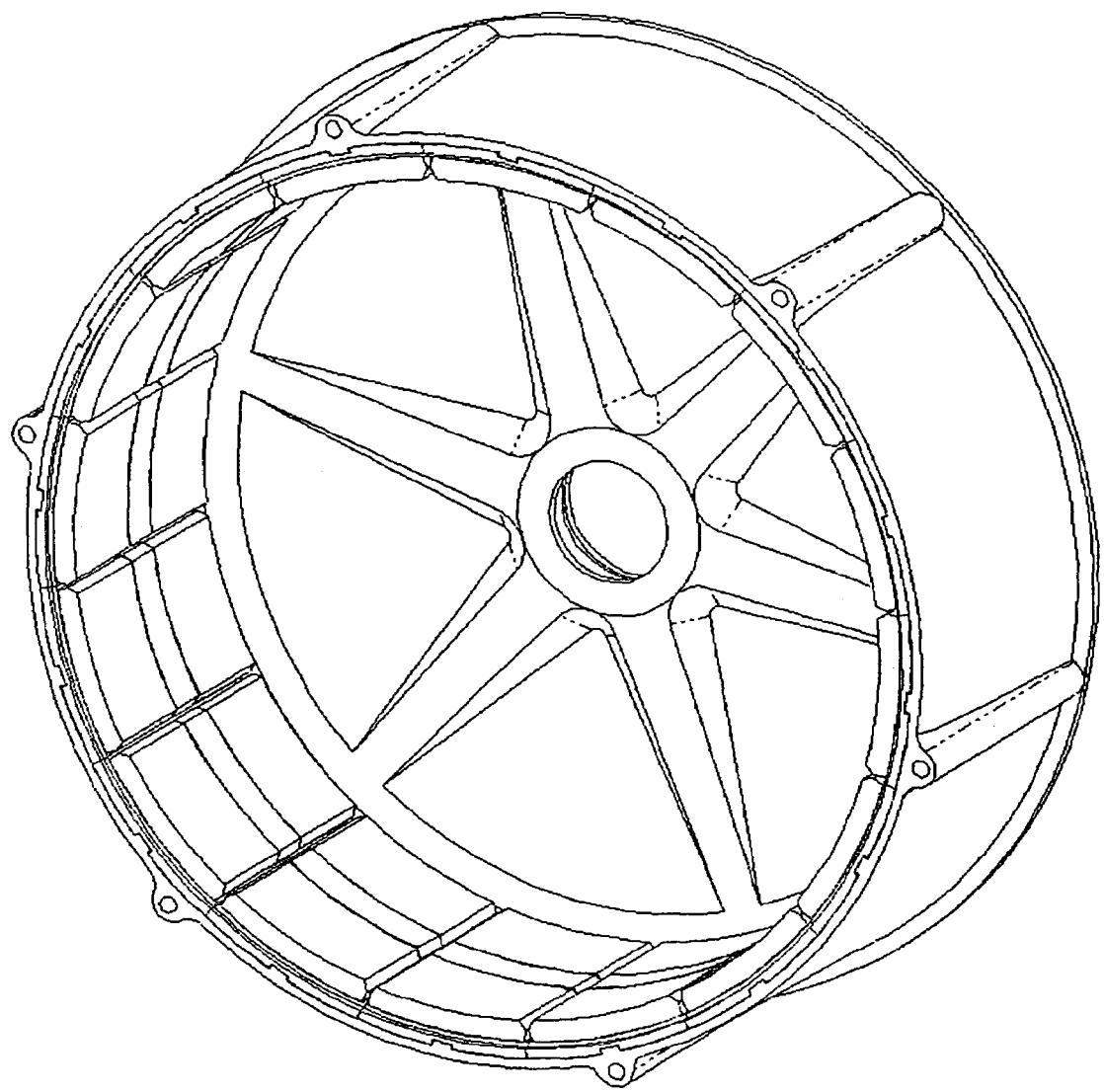
FIG. 8c shows an illustrative rotor assembly of the present invention with the cover removed, in perspective view.
Figure 8D:
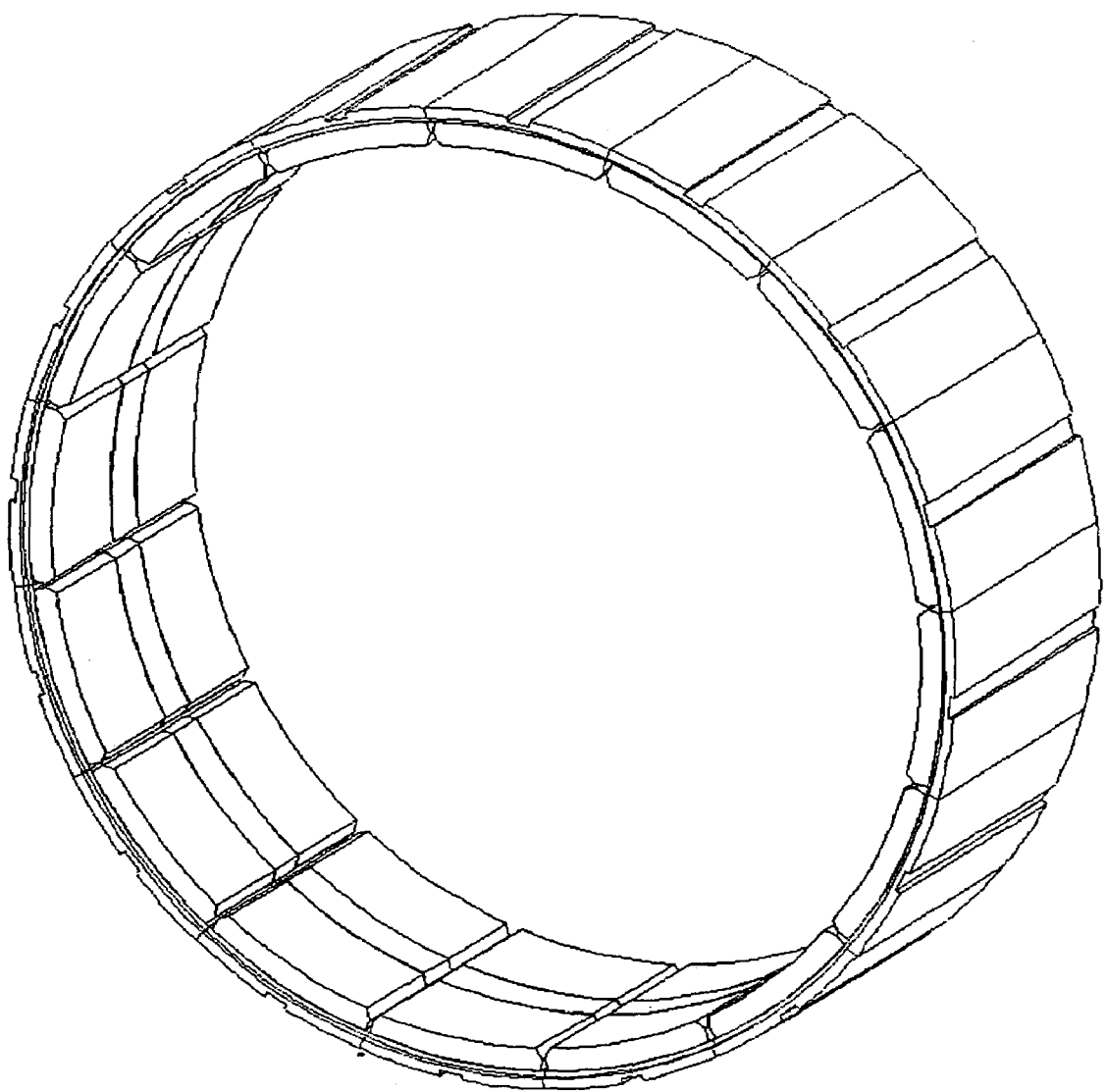
FIG. 8d shows an example of a permanent magnet module assembly of the present invention in perspective view.

As illustrated by FIG. 6, a series of permanent magnet assemblies 22 may then be created and installed in a rotor 20 that comprises a group of rotor segments installed in non-magnetic circular back plates 24. The stator 30 is then installed in the rotor assembly as a whole, as illustrated by FIG. 5, or in a segmented fashion, as shown in FIGS. 7a–7c. Quality control and alignment is then carried out to ensure that the machine functions as intended, or within an acceptable range of variance. As well, this provides the advantage of being able to remove individual portions of the stator, should a short circuit occur within the windings of any of the stator core groups 34, or any other malfunction should occur.

FIGS. 7a–7c illustrate a segmented stator housing assembly 140 in which the stator housing 142 is provided with grooved slots wherein electromagnetic pole pairs may be inserted. This allows for the rapid and convenient stator assembly and servicing by permitting the replacement of the entire stator core and the insertion and removal of stator core groups or elements. As well, sectioned permanent magnet subassemblies 41 may be provided in a manner that facilitates construction and servicing of the stator.

Figure 10A:
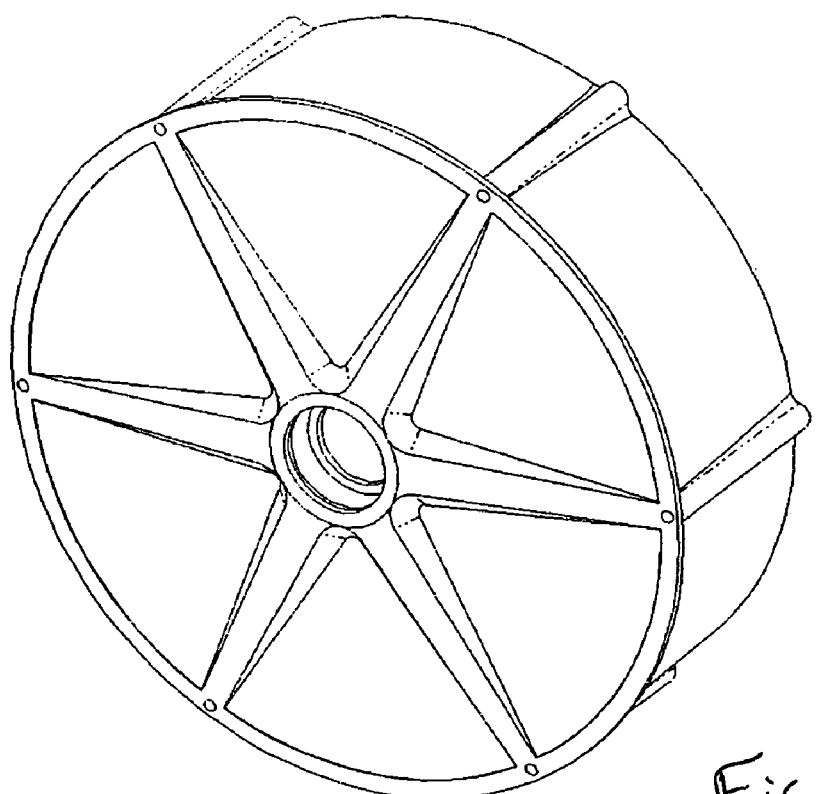
FIGS. 10a–10b show various perspective views of an illustrative rotor housing of the present invention without the rotor housing cover attached.
Figure 10B:
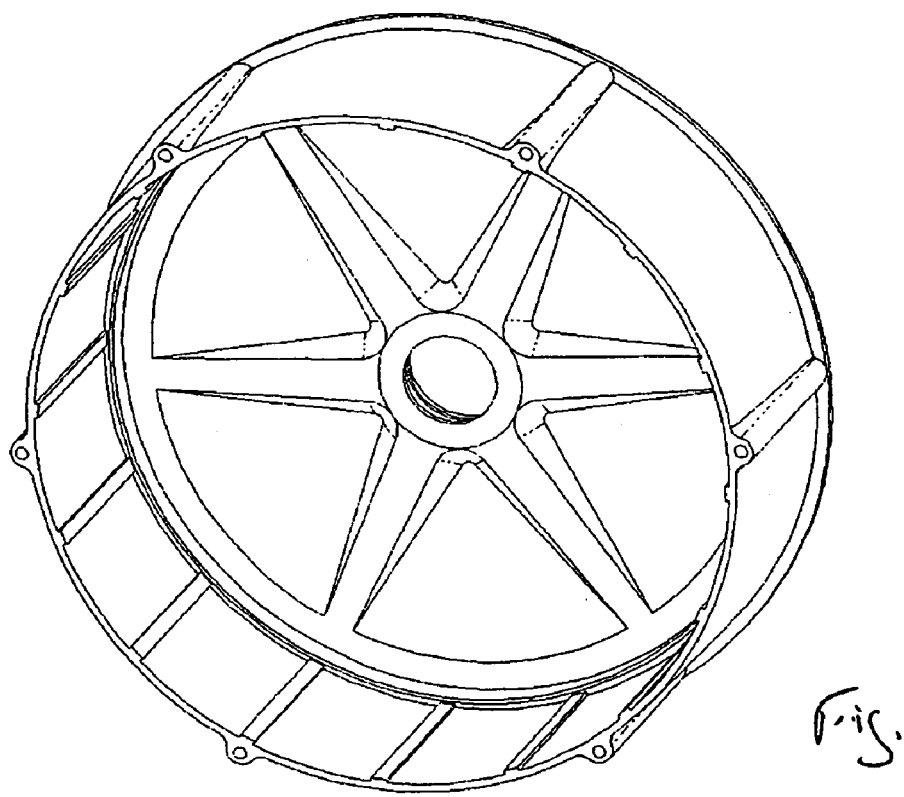
Figure 11A:
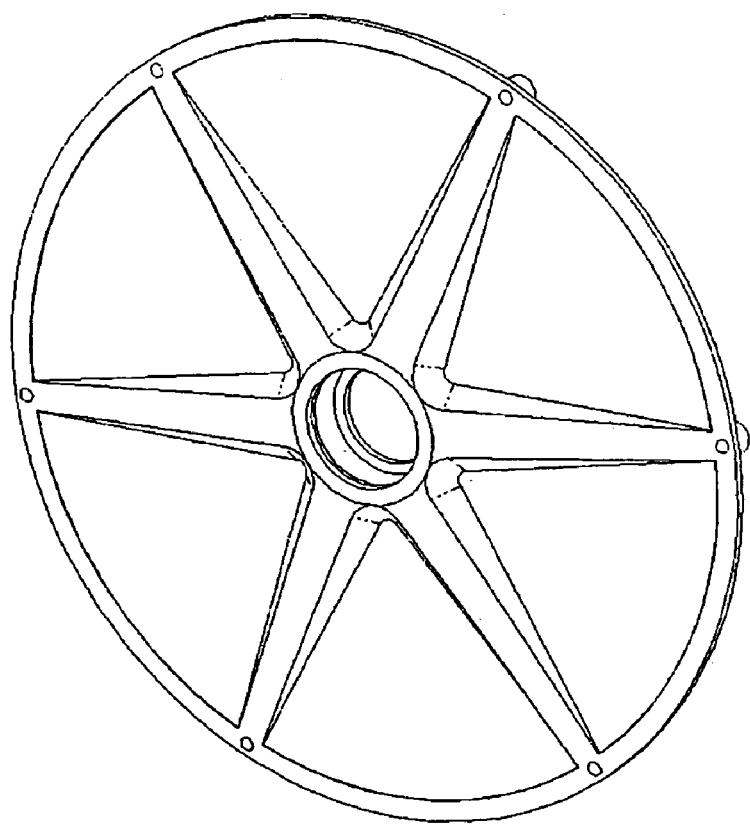
FIGS. 11a–11b show various perspective views of an illustrative rotor housing cover of the present invention.
Figure 11B:
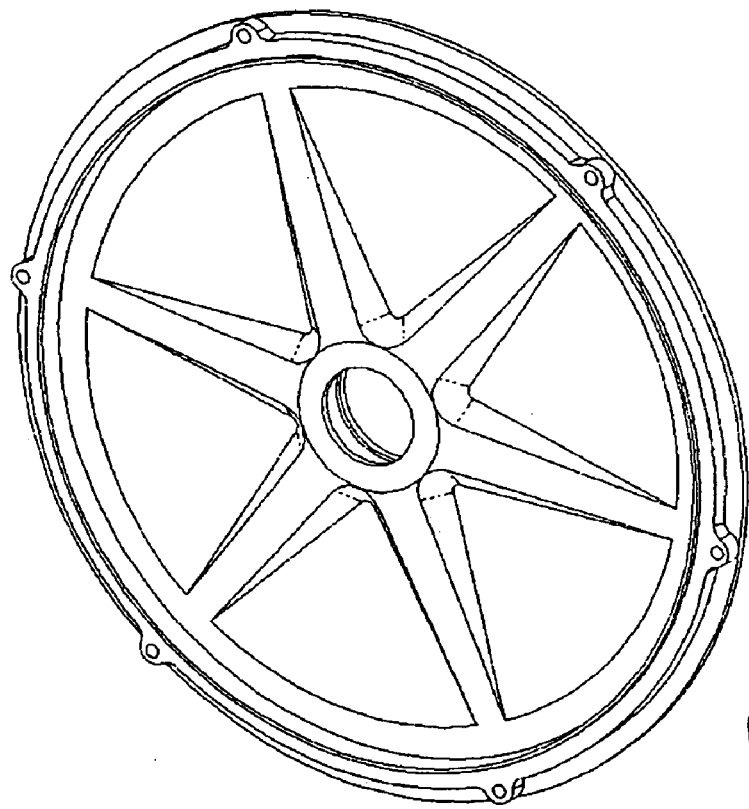

FIGS. 8a–8d illustrate a rotor assembly (FIG. 8a) that allows for the insertion of a permanent magnet module assembly (FIG. 8d) having segmented permanent magnets which are shown in FIGS. 9a–9b. The rotor housing, showing in various views in FIGS. 10a and 10b, may include a cover as shown in FIGS. 11a and 11b.

By constructing an electric machine in the manner herein described, it burden associated with construction and service of the machine is greatly reduced. By providing a segmented stator assembly having easily removable and replaceable electromagnetic circuits and/or permanent magnet subassemblies, scheduled and predictive service can be conducted without significant downtime or expense, as the motor can be serviced without removing the entire stator. However, given the modular nature of the construction of the electric machine of the present invention, it becomes possible to replace the entire stator while salvaging the electromagnetic circuits and permanent magnets that comprise the greatest portion of the expense of this type of machine. This method of construction permits the same ease of service with respect to the rotor, as well. Finally, unscheduled maintenance of the electric machine is facilitated by the ease by which repair and replacement of the individual components can be accomplished.

The present invention has been described herein with reference to examples in which the invention is used to manufacture machines. It will be clear to those skilled in the art that the present invention can be used in the manufacture of other products. For example, generators and other rotational machines in which there are multiple, discreet components that are structurally identical or equivalent.

What is claimed is:

1. A method for manufacturing an adaptive electric machine, comprising:
   fabricating a plurality of electromagnetic core elements;
   testing each of the electromagnetic core elements to identify electromagnetic core elements failing to meet quality control. criteria;
   arranging the electromagnetic core elements that meet the quality control criteria into stator segments;
   winding each stator segment with wire;
   testing each of the stator segments to identify stator segments failing to meet quality control criteria;
   assembling a stator from the stator segments meeting quality control criteria;
   fabricating rotor magnet segments comprising either permanent magnet segments, electromagnet segments or combinations thereof;

testing each of the rotor magnet segments to identify rotor magnet segments failing to meet quality control criteria;

assembling a rotor having rotor magnet segments meeting the quality control criteria;

inserting the stator into the rotor to form an electric machine;

performing a quality control test on the electric machine and producing a quality control result; and grading the electric machine in accordance with the result of the quality control test.

2. The method of claim 1 wherein each stator segment is electromagnetically isolated from other stator segments.

3. The method of claim 1 comprising assembling the stator in the rotor in a segmented manner or assembling the rotor in the stator in a segmented manner.

4. The method of claim 1 wherein the electromagnetic machine is assembled at the location where it is permanently installed.

* * * * *